United States Patent

Neale

[15] 3,699,543

[45] Oct. 17, 1972

[54] COMBINATION FILM DEPOSITED SWITCH UNIT AND INTEGRATED CIRCUITS

[72] Inventor: Ronald G. Neale, Birmingham, Mich.

[73] Assignee: Energy Conversion Devices, Inc., Troy, Mich.

[22] Filed: Dec. 22, 1969

[21] Appl. No.: 887,076

Related U.S. Application Data

[63] Continuation-in-part of Ser. Nos. 806,994, March 13, 1969, abandoned, and Ser. No. 773,013, Nov. 4, 1968, Pat. No. 3,629,863.

[52] U.S. Cl. ....................340/173 R, 307/303

[51] Int. Cl. ....................G11c 11/40

[58] Field of Search............340/173 R; 307/279, 303

[56] References Cited

UNITED STATES PATENTS 3,500,142 3/1970 Kahng ....................340/173

3,571,809 3/1971 Nelson....................340/173

3,544,977 12/1970 Bohner ..................340/173 R 3,480,843 11/1969 Richardson ............340/173 R 3,505,527 4/1970 Scana....................340/173 R

*Primary Examiner*—Terrell W. Fears

*Attorney*—Wallenstein, Spangenberg, Hattis and Strampel and Edward G. Fiorito

[57] ABSTRACT

A semiconductor substrate, like a silicon chip having various doped regions forming circuit elements, has semiconductor switch-forming units deposited thereon. The integrated circuit semiconductor switch combination desirably may form a memory matrix where the substrate has spaced parallel, doped conductor-forming regions of a given conductivity type extending in spaced, generally parallel relation. Spaced parallel bands of conductive material are deposited on an insulating film on a face of the substrate and extend generally transversely of said spaced parallel conductor-forming regions of the substrate. A two terminal memory switch device is formed on the substrate adjacent each active cross-over point of the transversely extending conductors, each memory switch device including a deposited film of semiconductor memory material having spaced portions electrically coupled between the associated cross-over point.

31 Claims, 20 Drawing Figures

INVENTOR
RONALD G. NEALE
BY: Wallenstein, Spangenberg, Hattis & Strampel
ATTYS.

INVENTOR
RONALD G. NEALE
BY: Wallenstein, Spangenberg, Hattis & Strampel
ATTYS.

INVENTOR
RONALD G. NEALE

By: Wallenstein, Spangenberg, Hattis & Strampel
ATTYS.

INVENTOR
RONALD G. NEALE

By: Wallenstein, Spangenberg, Hattis & Strampel
ATTYS.

INVENTOR
RONALD G. NEALE
By: Wallenstein, Spangenberg, Hattis & Strampel ATTYS

INVENTOR
RONALD G. NEALE

BY: Wallenstein, Spangenberg, Hattis & Strampel ATTYS

COMBINATION FILM DEPOSITED SWITCH UNIT AND INTEGRATED CIRCUITS

This invention is a continuation-in-part application of application, Ser. No. 806,994 filed Mar. 13, 1969 now abandoned, entitled "Non-Destructive Memory Matrix," and application, Ser. No. 773,013, filed Nov. 4, 1968 now U.S. Pat. No. 3,629,863 "Film Deposited Circuits and Devices Therefor."

Integrated circuits using semiconductor bodies in which diodes, transistors, resistors and other circuit elements are formed therein have reduced the size of electronic circuitry to an amazing degree. However, such integrated circuitry has not heretofore been found useful in the formation of such circuits as storage matrices requiring special devices like magnetic core and other memory devices which cannot be readily formed therein. The present invention provides a unique combination of integrated circuit semiconductor bodies and semiconductor switch devices not readily formable within such substrates to form storage matrices and other circuits which cannot be fabricated within integrated circuit forming bodies. The resultant circuits provide a degree of miniaturization of these matrix circuits and the like not heretofore achieved. Moreover, the matrix application of the present invention provides a coincident voltage memory matrix which is less expensive and much easier to use than magnetic and other memory matrices of the prior art. Unlike a good many magnetic core type memories, the memory matrix application of the present invention can be read non-destructively (without erasing or decaying the record and requiring a rewrite restoration operation each time). At present, the most conventional readout cycle with magnetic memories includes reading, temporary storage, and rewriting before another address can be read. The preferred form of the coincident voltage memory matrix application of the invention requires only one step instead of three steps in the readout operation, a simpler sub-routine is used to control the readout cycle than in magnetic memories, and the stored data is not exposed to possible error, loss or decay during readout as in the case of magnetic memories. These readout advantages can be very important where stored information will be held during repeated readouts (stored tables of data or the steps of a computer sub-routine, for example).

Apart from advantages of non-destructive readout, the coincident voltage memory matrix application of the invention is well suited to driving from transistors because of the modest drive voltage and current levels involved, and readout can be accomplished without expensive multi-stage sensitive read amplifiers because the readout signal can be at a D.C. voltage level directly compatible with D.C. logic circuits, requiring no further amplification.

In coincident voltage memory matrix application of the invention, the entire matrix, other than the read and/or write circuits, is formed within and on a semiconductor substrate, such as a silicon chip, which is doped to form spaced, parallel X or Y axis conductor-forming regions within the body. In "read-write" memory matrices, the substrate is further doped to form isolating diodes or transistor elements for each active cross-over point. The diode or transistor elements have one or more terminals exposed through openings in an outer insulating coating on the substrate. The other Y or X axis conductors of the matrix are formed by spaced parallel bands of conductive material deposited on the insulation covered semiconductor substrate. The memory matrix further includes a deposited memory device including a film of memory semiconductor material on the substrate adjacent each active cross-over point of the matrix. The film of memory semiconductor material is connected between the associated Y or X axis band of conductive material in series with the isolating diode or transistor where such an isolating element is present. Each film of memory semiconductor material is most advantageously one of the semiconductor materials disclosed and claimed in U. S. Pat. No. 3,271,591, granted on Sept. 6, 1966 to S. R. Ovshinsky. In this patent, the memory devices using these materials are referred to as "Hi-Lo" devices.

The memory type semiconductor materials like or similar to those disclosed in said U.S. Pat. No. 3,271,591 are capable of being film deposited on a substrate surface in precisely controlled amounts and by etching the same through photosensitive resist coatings formed into a precise small size at any desired location on the substrate surface. Therefore, such memory type semiconductor materials make possible the formation of integrated circuit matrix arrays on silicon chip substrates which have a multitude of electronic components, such as the aforesaid transistors and/or diodes, formed therein.

In the form of the matrix application of the invention where a diode is used as the isolating element, the diode is most desirably formed immediately above the associated X or Y axis conductor formed within the semiconductor substrate, the associated memory device is deposited over the associated diode and the associated Y or X axis conductor passes over the superimposed memory device and diode so that a maximum packing density is achieved. However, in accordance with a more general aspect of the invention, the memory devices can also be positioned in offset relation to the associated diode or transistor.

The deposited film memory device used in the memory matrix referred to is a two-terminal bistable device including a layer of memory semiconductor material which is capable of being triggered into a stable low resistance condition when a voltage applied to the spaced portions of this layer exceed a given threshold voltage value and current is allowed to flow for a sufficient duration (e.g., 1–100 milliseconds or more) to cause alterations thereof to a low resistance condition which remains indefinitely in its low resistance condition, even when the applied voltage and current are removed, until reset to a high resistance condition as by feeding a relatively short duration reset current pulse therethrough (e.g., a pulse of 10 microseconds or less). The reversible alteration of a layer or film of the memory semiconductor materials of the kind disclosed in said U.S. Pat. No. 3,271,591 between the high resistance condition and the low resistance condition can involve configurational and conformational changes in atomic structure of the semiconductor material which is preferably a polymeric type structure, or charging and discharging the semiconductor material with current carriers, or combinations of the two wherein such changes in atomic structure freeze in the charged conditions in one or more conducting paths formed through the semiconductor material. In its stable high resistance condition, these memory semiconductor materials (which are preferably polymeric materials) are believed to be in a substantially disordered and generally amorphous condition having local order and/or localized bonding for the atoms and a high density of local states in the forbidden band which provide high resistance. Changes in the local order and/or localized bonding which constitute changes in atomic structure, i.e., structural change, which can be of a subtle nature, provide drastic changes in the electrical characteristics of the semiconductor material. The changes in local order and/or localized bonding, providing the structural change in the semiconductor material, can be from a disordered condition to a more ordered condition, such as, for example, toward a more ordered crystalline like condition. The changes can be substantially within a short range order itself still involving a substantially disordered and generally amorphous condition, or can be from a short range order to a long range order which could provide a crystalline like or psuedo crystalline condition, all of these structural changes involving at least a change in local order and/or localized bonding and being reversible as desired. Desired amounts of such changes can be effected by application of selected levels of current energy.

A readout operation on the voltage memory matrix to determine whether a memory device at a selected cross-over point is in a low or high resistance condition involves the feeding of a voltage across the associated X and Y axis conductors which is insufficient to trigger the memory switch device involved when in a high resistance condition to a low resistance condition and of a polarity to cause current flow in the low impedance direction of the associated isolating element. The use of a transistor rather than a diode as an isolating element is used when it is desired to reduce the voltage or current requirements of the matrix driving circuits.

For consistency and reliability of operation, the path of conduction through the semiconductor layer of each deposited memory device of the matrix is constrained to follow a limited consistent path by depositing beneath each semiconductor film a spot or patch of insulating material having a small pore therein so that only a small portion of the outer surface of each X or Y axis conductor involved is exposed for application of the layer of semiconductor material involved. Then, when the layer of memory device-forming semiconductor material is deposited over the pore formed in the spot or patch of insulating material involved, the semiconductor material enters the pore in the spot or patch of insulating material and makes contact with the X or Y axis conductor involved over a very small area. For example, the diameter of each pore and hence the area of contact referred to may be in the range of from about 5 to 40 microns, preferably 20 microns or less in the most preferred form of the invention, so a filamentous current conducting path will occur in the semiconductor layer consistently through the same portion of the semiconductor material. (However, other configurations than the pore structure configuration just described may be used for the memory switch devices and these will be described later on in the specification.)

The pore can be formed in the spot or patch of insulating material referred to by depositing a photosensitive acid resist material which becomes fixed when subjected to light on the film deposited surface of the substrate involved, placing a photoemulsion mask having light transparent areas on the portions of the mask which are to cover the portions of the resist which are not to be removed with acid or other chemical treatment and light opaque areas on the portions of the mask which are to overlie the point on the insulation material to contain the pore, exposing the assembly to light, developing the exposed photosensitive resist material, etching away the unexposed unfixed portions of the resist material with a suitable chemical, and then baking off the exposed fixed portions of the resist material.

The semiconductor material and the X or Y axis conductors which are located outside the silicon chip may be located on selected areas of the insulated substrate by suitable etching techniques as described or by deposition through apertures masks. (A particular advantageous process for selectively forming memory switch devices like that described is disclosed in my copending application, Ser. No. 867,341, filed Oct. 17, 1969 and now U.S. Patent No. 3,675,090 entitled PORE STRUCTURE FOR FILM DEPOSITED SWITCH DEVICES.

The non-volatile voltage memory matrix constructed in accordance with the invention as described can be mass produced with exceedingly large packing densities.

The above and other advantages and features of the invention will become more apparent upon making reference to the specification to follow, the claims and the drawings wherein:

FIG. 15A is a sectional view of the matrix array of FIG. 14 taken along section line 15A—15A therein.

Figure 1:
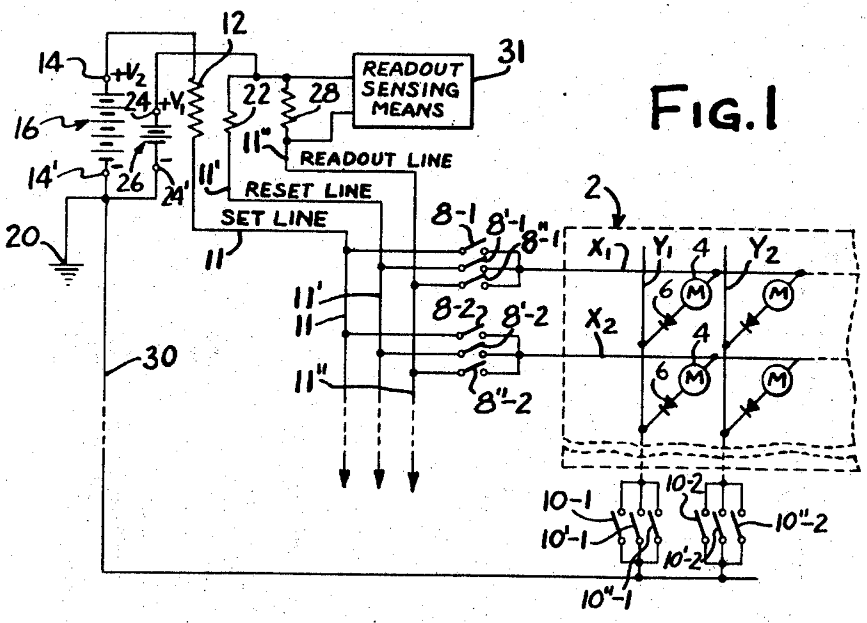
FIG. 1 is a fragmentary circuit diagram of a voltage memory matrix to which the present invention may be applied and exemplary circuits for writing information into and reading information from the matrix.

Referring now more particularly to FIG. 1, there is shown a voltage memory matrix generally indicated by reference numeral 2 which comprises a series of mutually perpendicular X and Y axis conductors respectively identified as conductors X1, X2, etc., and Y1, Y2, etc. The X and Y axis conductors cross one another when viewed in a two dimensional drawing, but the conductors do not make physical contact. Rather, each X and Y axis conductor is interconnected at or near their cross-over point by a series circuit of a memory device 4 and (in a "read-write" type matrix) by an isolating element which is a diode 6 in FIG. 1. The information is stored at each cross-over point preferably in the form of a binary "1" or "0" digit indicated by the state or condition of a memory element. In the present invention, the binary digit information at each cross-over point is determined by whether the memory device 4 thereat is in a low resistance condition, which will arbitrarily be considered a "1" binary state, or a high resistance condition, which will arbitrarily be considered a "0" binary state. The diode 6 isolates each cross-over point from the other cross-over points.

A switching system is provided (the details of which may vary widely) for connecting one or more voltage sources between a selected X and a selected Y axis conductor to perform a setting, resetting or readout operation at the cross-over point, the setting being a "-write" function. As illustrated, each X axis conductor is connected to one of the ends of a set of three parallel switches 8, 8′ and 8″ (which switches are identified by additional numerals corresponding to the number assigned to the X axis conductor involved), the other ends of which are respectively connected to set, reset and readout lines 11, 11′ and 11″. The set line 11 is connected through a resistor 12 to a positive terminal 14 of a source of D.C. voltage 16 which produces an output of +V2 volts. The negative terminal 14′ of the source of D.C. voltage is grounded at 20 so the voltage of terminal 14 is +V2 volts with respect to ground. The reset line 11′ is coupled through a relatively small resistor 22 to the positive terminal 24 of a cource of D.C. voltage 26 whose negative terminal 24′ is grounded at 20. The positive terminal 24 produces a voltage of +V1 volts above ground. The readout line 11″ is also connected to the positive terminal 24 of the source 26 but through a resistor 28.

Each Y axis conductor is connected to one of the ends of a set of parallel switched 10, 10′ and 10″ which are also identified by another number corresponding to the number of the X or Y axis conductor involved. The other ends of these switches are connected to a common ground line 30.

The switches 8, 8′, 8″, 10, 10′ and 10″ can be high speed electronic switches or contacts. Manifestly, high speed electronic switches are preferred. Switch control means (not shown) are provided to close the appropriate pair of switches to connect the proper positive and negative voltage sources respectively to the selected X and Y axis conductors.

Figure 2B:
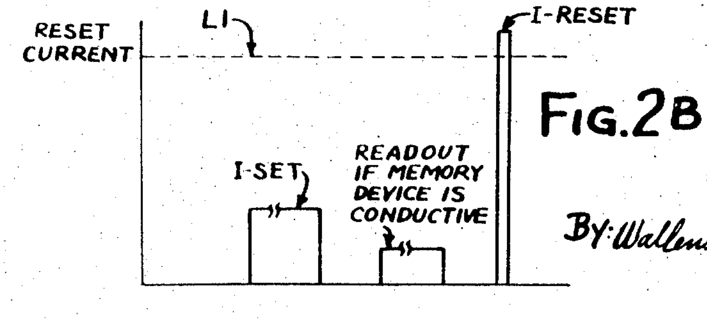
FIG. 2B is a diagram illustrating the different currents which flow through the selected cross-over point during setting, resetting and reading of a "1" binary digit at a particular cross-over point of the matrix.

As previously indicated, each memory device 4 is a threshold device in that, when it is in a high resistance condition, a voltage which equals or exceeds a given threshold value must be applied thereacross to drive or trigger the same into its stable low resistance condition which remains even if the applied voltage and current disappear completely, until reset by a resetting current pulse thereby producing a non-volatile storage device. To write a binary digit "1" into the memory device at any cross-over point requires the application of a voltage across the selected X and Y axis conductor which is of a polarity to pass current through the associated diode 6, which will be assumed to have a very small resistance in its conducting direction relative to the high resistance value of the memory device 4, and has a magnitude which equals or exceeds the threshold value of the memory 6. For example, if the memory switch device 4 has a threshold value of 20 volts, this means that the output V2 of D.C. voltage source 16 should exceed 20 volts. When a binary digit "1" is stored in a particular memory device 4, the application of a readout voltage V1 (see FIG. 2A) across the associated X and Y axis conductors which is less than the voltage threshold value of the memory device involved will result in the flow of significant readout current (FIG. 2B) through the resistor 28 in series with the readout line 11″ because the memory device is in its low resistance condition. On the other hand, if the selected memory device is in a high resistance condition, this readout voltage will not be high enough to trigger the memory switch device into its low resistance condition, so substantially no current will flow through the resistor 28. Accordingly, a readout circuit 31 is provided which senses the voltage drop across the resistor 28 to determine whether or not the selected cross-over point is in a binary "1" or "0" state.

Figures 2A, 3, 4:
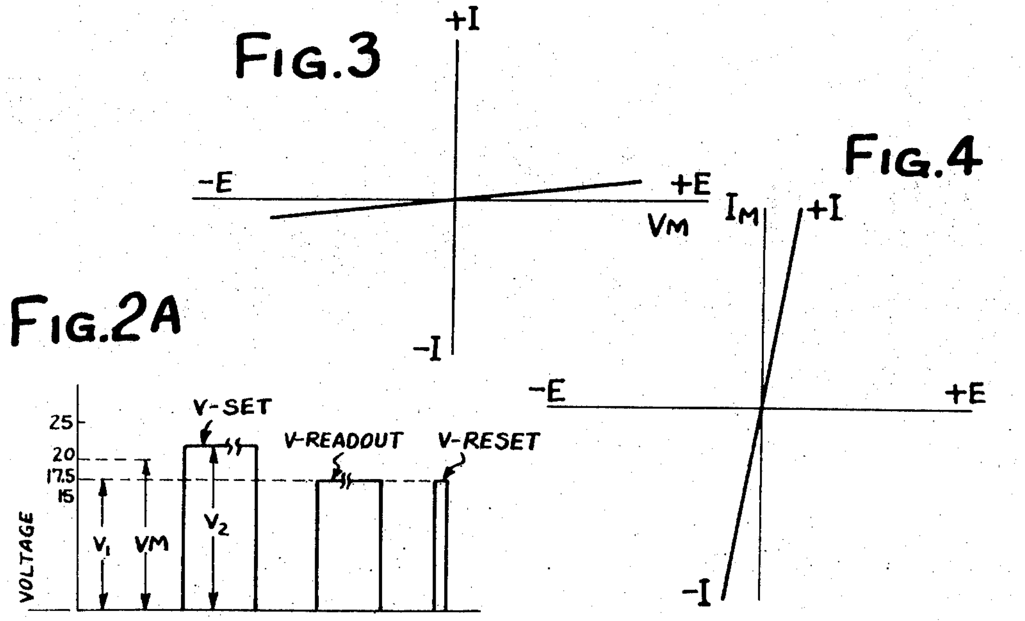
FIG. 2A illustrates the voltages which are applied to a selected cross-over point of the matrix for setting the same (i.e., storing a "1" binary digit at the cross-over point), for resetting the particular cross-over point of the matrix (i.e., storing a "0" binary digit at the cross-over point), and reading out the binary digit stored in a particular cross-over point of the matrix.
FIG. 3 is a voltage-current characteristic of a memory device which is used at each cross-over point of the matrix when the device is in its high resistance condition.
FIG. 4 shows the voltage-current characteristic of a memory device which is used at each cross-over point of the matrix when the device is in its low resistance condition.

To reset a memory device 6 to its "0" or high resistance state, the V1 output of the D.C. voltage source 26 is applied across the associated X and Y axis conductors. With the memory semiconductor materials disclosed in U.S. Pat. No. 3,271,591, this voltage is applied for a very short duration (e.g., 10 microseconds or less) to produce a short reset current (FIG. 2B) exceeding a value L1. As indicated in FIG. 2A, the exemplary V1 reset voltage illustrated therein is 17.5 volts which is below the threshold value Vm (20 volts) of the memory device. The resistance 22 is, of course, selected to provide a reset current at or greater than the L1 value shown in FIG. 2B.

FIG. 3 shows a typical voltage-current characteristic of each memory device 4 in its high resistance condition and FIG. 4 shows the voltage-current characteristic of each memory device 4 in its low resistance condition. A typical range of low resistance values for a memory device of the type disclosed in the above identified patent is 1 to 1,000 ohms and a typical range of high resistance values for such a device is a hundred or more times the latter number of ohms.

In the operation of the memory devices 4, the switchover between high resistance and low resistance conditions is substantially instantaneous and is believed to occur along a filamentous path between spaced apart points as defined by conductive electrodes in contact with the film or layer of semiconductor material forming the memory device involved. The semiconductor material disclosed in the aforesaid patent are bidirectional so that the switch-over occurs independently of the polarity of the applied voltage. Also, it should be noted from an examination of FIG. 4 that in the low resistance condition of the memory device the current conduction is substantially ohmic so there is an increase in voltage drop thereacross with an increase of current flow therethrough. In some instances, however, it has been observed that current conduction of the memory device takes place at a substantially constant voltage drop across the device at relatively high current levels although it is ohmic at lower current levels.

Figure 5:
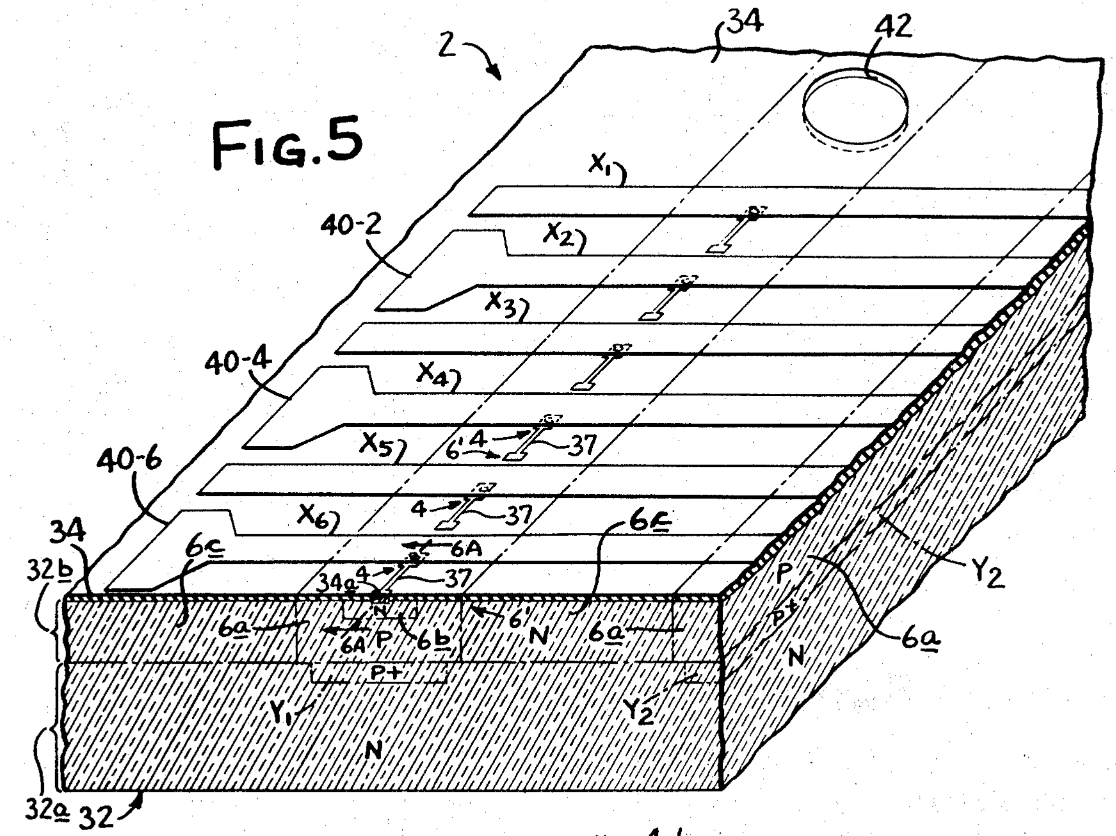
FIG. 5 is a broken-away perspective view of a portion of a silicon chip which has been doped to include the Y axis conductors and the diodes of the memory matrix of FIG. 1 and on which has deposited upon the insulated upper surface thereof the X axis conductors and the memory devices of the matrix of FIG. 1.
Figure 6A:
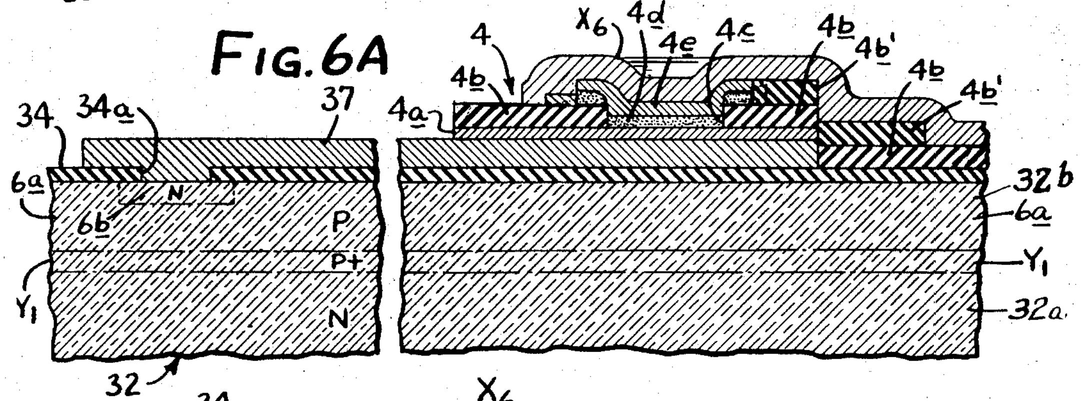
FIG. 6A is an enlarged fragmentary sectional view through the memory matrix construction shown in FIG. 5, taken along section line 6A—6A therein.
Figure 6B:
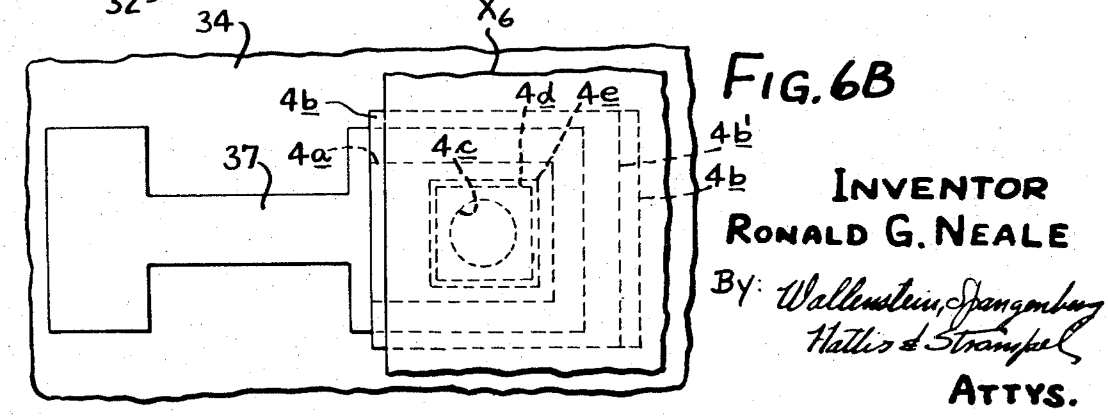
FIG. 6B is a plan view of the portion of the memory matrix shown in FIG. 6A.

As previously indicated, the matrix application of the present invention deals with the unique physical forms of memory matrices, one of which is shown in FIG. 5, 6A and 6B to which reference should now be made. This and the other forms of the invention provide within a semiconductor substrate body, identified by reference number 32 in FIGS. 5 and 6A, either the X or the Y axis conductors of the matrix (here it being the Y axis conductors) and, in "read-write" matrices, isolating elements like diodes or transistors are also formed within the body 32. The memory devices and the other Y or X conductors of the matrix (here being the X axis conductors) are formed on top of the semiconductor substrate body 32 by suitable film deposition techniques. The semiconductor substrate body 32 is overlaid with an insulating layer 34 which is selectively etched away in those areas where electrical contact must be made with the diode or transistor-forming regions of the semiconductor substrate body.

In FIGS. 5 and 6A, the semiconductor substrate body 32 is shown as being of the N conductivity type (it being understood that all portions of the semiconductor substrate body 32 may be of the opposite conductivity type than that shown). The substrate body 32 includes a main bottom portion 32*a* which may be a silicon chip upon which parallel regions Y1, Y2, etc., of heavily doped P+ conductivity type are formed using, for example, well known masking techniques to form low resistance current paths to constitute the Y axis conductors of the matrix. An epitaxial layer 32*b* of the N type conductivity material is shown which is grown upon the bottom portion 32*a* to form a semiconductor substrate body 32 within which is deeply embedded the Y axis conductor-forming regions Y1, Y2, etc. The portions of the epitaxial layer 32*b* overlying the Y1, Y2, etc., regions are then lightly doped to form P conductivity type regions 6*a* extending completely through the epitaxial layer 32*b* to be in contact with their associated Y axis conductor. These lightly doped regions 6*a* form relatively high resistance anode electrodes of isolating P-N junction diodes 6′ which regions 6*a* are isolated by the N conductivity type regions 6*c* on the opposite sides thereof. Then N conductivity type regions 6*c* also insulate the Y1, Y2, etc., regions from one another. In the matrix of FIGS. 5, 6A and 6B the diodes 6′ have their anodes integrated with the associated Y axis conductors formed by the regions Y1, Y2, etc., immediately beneath the same. The cathodes 6*b* of the individual diodes 6′ are formed by selectively lightly doping the upper faces of the epitaxial layer 32*b* over an area adjacent each matrix cross-over point with N conductivity type doping material so the diode cathode-forming region of each cross-over point of the matrix is isolated from the diode cathode-forming regions of the other cross-over points of the matrix.

The semiconductor substrate body 32 has the film or layer 34 of insulation material with openings 34*a* in registry with the cathode forming regions 6*b* of the substrate body 32. The insulating film may simply be the air oxidized surface of the silicon ship. (Note that if the various regions of the substrate body were doped with materials of opposite conductivity types, the openings 34*a* would be in registry with diode anode-forming regions instead of diode cathode forming regions.) Electrical connection to each cathode forming region 6*b* of the substrate body 32 is made by a deposited strip 37 of conductive material like aluminum forming a conductor on the layer 34 of insulation material and extending into the associated opening 34*a* in the insulation layer. Each conductive strip 37 extends beneath the associated memory device 4.

Although each memory device 4 may take a variety of forms, in the form shown in FIG. 6A and 6B it includes a bottom electrode 4*a* formed of a substantially amorphous (i.e., not macro-crystalline) refractory conductive material, preferably molybdenum, which does not readily migrate into the adjacent layer of memory semiconductor material deposited thereon (as can aluminum when the aluminum is positive with respect to the memory semiconductor material). Other refractory materials which can be used are tungsten, niobium, tantalum and refractory metal oxides, carbides and sulphides. Most advantageously, the refractory electrode 4*a* is deposited in an amorphous condition to be more compatible with the generally amorphous condition of the preferred memory semiconductor material. This is accomplished by depositing a vaporized refractory material on a relatively cool substrate body so that the molybdenum sets quickly and remains amorphous. Current flow through a memory device is believed to occur in a limited path or filament in the body of semiconductor material and to ensure consistent conducting characteristics in such a device it is believed important to constrain the flow of current through the same region and preferably the same path or filament of the body of semiconductor material each time the device is triggered to its conducting condition. To this end, as illustrated in the drawings, a layer 4b of insulating material like alumina or silicon is deposited over each molybdenum layer 4a, such layer preferably extending beyond the end edges of the aluminum and molybdenum layers, as illustrated. The portion of the insulating layer 4b overlying the molybdenum layer 4a has a pore or small hole 4c formed therein so that only a small portion of the upper surface of each bottom electrode 4a is exposed for application of a film or layer 4d of memory semiconductor material deposited over and within each pore 4c, so that the memory semiconductor material 4d deposited therein makes contact with the bottom electrode 4a over a very small area. For example, the width of each pore 4c is most advantageously in the range of from about 5 to 40 microns, preferably about 20 microns. This memory semiconductor material is most advantageously applied by sputtering or vacuum deposition techniques. Although the memory semiconductor material could be applied so it fills each pore 4c, more reliable memory devices may result if such material is applied over an area larger than the pore and in a thickness so it fills only part of the pore. The balance of the pore is then most advantageously filled with a substantially amorphous refractory conductive material like molybdenum. If the memory semiconductor material were not isolated in this manner, as when the memory semiconductor material overflows the pore 4c, an application of a film of molybdenum of lesser thickness than the memory semiconductor material could expose an edge of the memory semiconductor material so an overlayer of aluminum would make contact with the semiconductor material. The upper molybdenum electrode layer 4e is, in the most preferred form of the invention, overlaid directly by an associated deposited layer of X axis conductor-forming material like aluminum so that a maximum packing density of matrix conductors can be achieved, although this is not necessary in accordance with the broader aspects of the invention.

It is, of course, necessary electrically to insulate the inner electrode 4a of each memory device from the outer conductive layers with a sufficient thickness of insulation so the voltages present in the circuit applied across the thin films will not cause puncturing of the insulation. The edges of the inner deposited layers 37 and 4a of conductive material are particularly difficult to insulate as the insulation layer 4b thins out or disappears at these edges. In such case, a second layer 4b' of insulation material is deposited over the layer 4b as shown in FIG. 6A before the X axis conductor-forming layer (X6 in FIG. 6A) is deposited over the memory device, the second layer 4b' of insulation material covering these edges being of a fairly substantial thickness, as illustrated.

The X axis conductor deposits X1, X2, X3, etc., have alternating enlarged end portions, such as 40-2, 40-4, etc., to provide more convenient connection points for external conductors making connection to the X axis conductors. FIG. 5 shows only one of the ends of the various X axis conductors, it being understood that the opposite ends of the conductors X1, X3, X5, etc., have enlarged end portions similar to the enlarged end portions 40-2, 40-4, etc. This alternating configuration of the X axis conductors permits for a closer spacing of the conductors to provide a maximum packing density for this configuration of integrated memory matrix.

Access to each Y axis conductor is made by etching a shallow opening or window 42 in the insulating layer 34 above the same to expose the P type region 6a of the epitaxial layer 32b and depositing aluminum or the like therein so it alloys or intimately makes electrical connection with the P type region. (Where the N and P regions of the substrate body 32 are reversed from that shown, it is is necessary to dope the region under the window 42 heavily to produce an N+ region before depositing aluminum in the window.)

Figures 7, 8, 12:
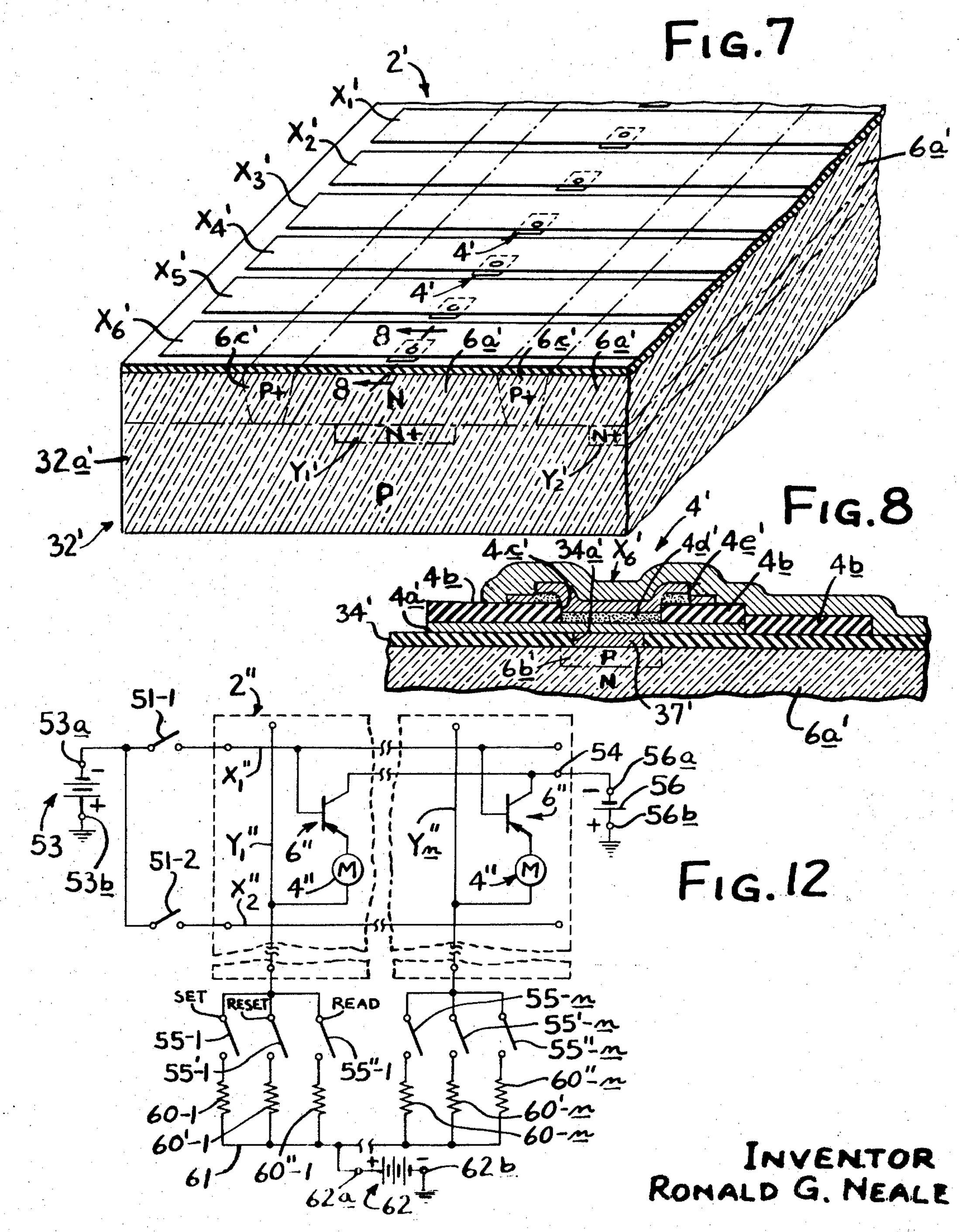
FIG. 7 shows a substantially modified memory matrix which is similar to that shown in FIG. 5 except that a greater packing density is achieved by superimposing the diode and memory devices of the matrix.
FIG. 8 is a fragmentary sectional view through the memory matrix construction of FIG. 7 taken along section line 8—8 thereof.
FIG. 12 is a schematic diagram of the memory matrix of FIG. 9 including the various read and write circuits associated therewith.

Refer now to the embodiments of the invention shown in FIGS. 7 and 8 which shows a memory matrix 2' having a semiconductor substrate body 32' which is substantially similar to that shown in FIG. 5 except that the bottom portion 32a of the body substrate is made of P rather than N conductivity type material and the epitaxial layer 32b' is a layer of N type material grown on the P type bottom portion 32a of the substrate body. In such case, the Y axis conductors of the matrix 21 are spaced, heavily doped N+ regions Y1', Y2', etc., on the upper surface of the bottom portion 32a of the substrate body 32. Also, portions 6c' of the epitaxial layer 32b on each side of the Y1', Y2' regions are then heavily doped to provide P+ conductivity type regions extending completely through the epitaxial layer 32b' to be in contact with the original substrate layer 32a. This leaves isolated channels 6a' in the original epitaxial layer above each Y axis conductor electrically connected to the same. Each such isolated N type region 6a' becomes the cathode of the isolating P-N junction diode 6'. The heavily doped P+ regions 6c' also insulate the N+ matrix conductor-forming regions from one another.

The anode-forming regions 6b' illustrated in FIG. 7 are closely spaced together to provide a matrix of greater packing density than is possible in the embodiment of FIG. 5. To permit this greater packing density, the enlarged end portions of the X axis conductors in the embodiment of FIG. 5 have been eliminated, permitting a much closer spacing of the X axis conductors, and the memory devices 4' and the X axis conductors are positioned directly over the anode-forming regions 6b'. In such case, the conductive strips 37 of FIG. 5 are eliminated. The memory devices 4' at each cross-over point of the matrix are similar in construction to the memory devices 4 previously described and corresponding reference numbers with primes (') added are used in FIG. 8. Since molybdenum films are relatively difficult to form in thicknesses in excess of 0.1 mils, if the depth of the insulating layer holes 34a' is such that the molybdenum lower electrode required to fill the opening and extend therebeyond exceeds this thickness, each hole may be filled with aluminum 37′ as shown in FIG. 8.

Another difference between the memory devices 4′ and 4 is that the second layer 4b′ of insulation material shown in FIG. 6A is omitted from the memory devices 4′ in FIGS. 7 and 8 since the edge of the lower molybdenum layer 4a′ is so thin that the insulation pore-forming layer 4b is sufficiently thick to cover over the edge thereof. (In the embodiment of FIG. 5, the molybdenum layer extends directly over the double thickness of the conductive strip 37 and the molybdenum layer is not sufficiently covered by the single pore-forming insulating layer 4b.)

Figures 9, 10, 11:
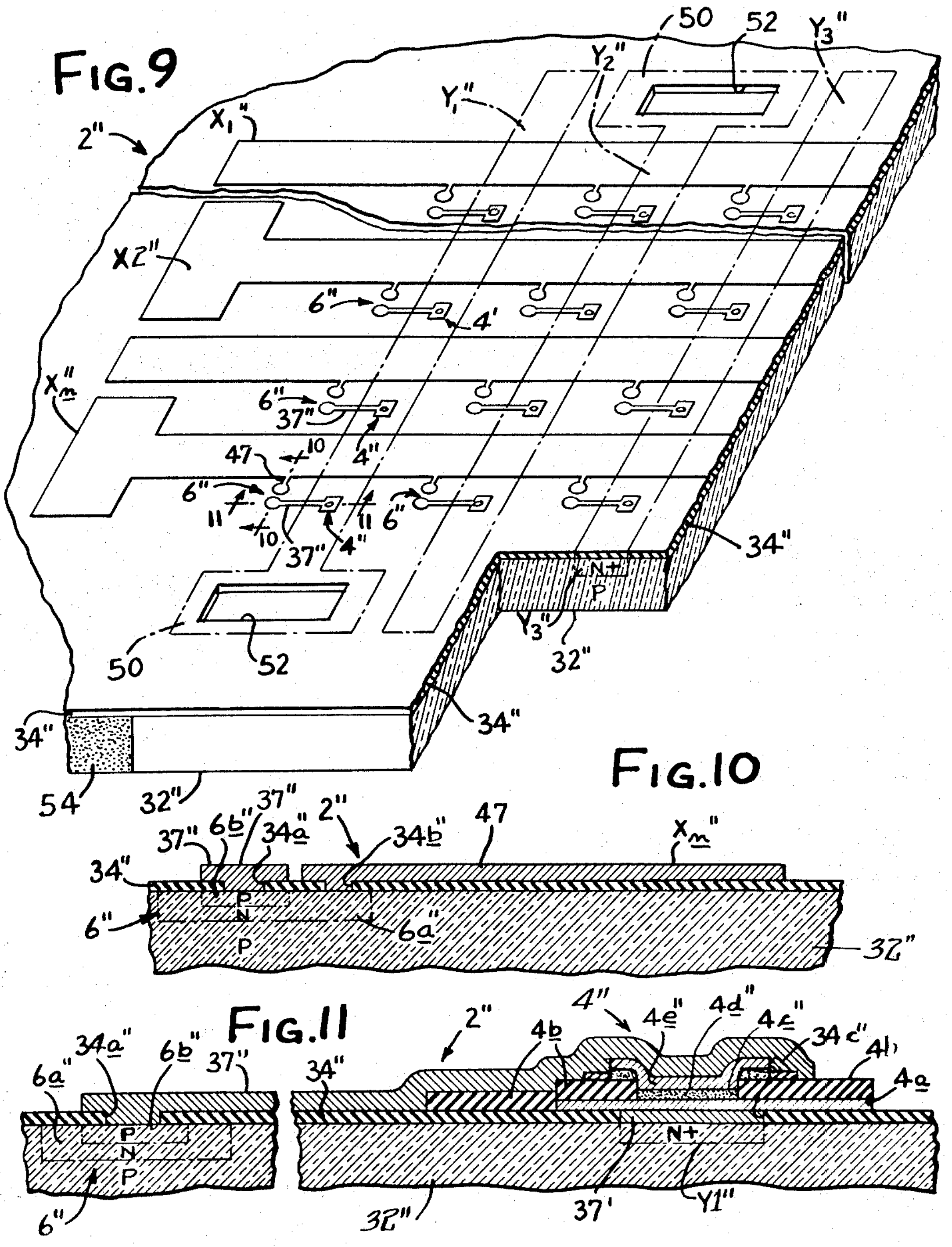
FIG. 9 is a broken-away, perspective, fragmentary view of a memory matrix construction which utilizes a transistor rather than a diode connected in series with a memory device at each cross-over point of the memory matrix.
FIG. 10 is an enlarged sectional view through the memory matrix construction of FIG. 9, taken along section line 10—10 thereof.
FIG. 11 is an enlarged sectional view through the memory matrix construction of FIG. 9, taken along section line 11—11 thereof.

Refer now to FIGS. 9 through 11 which illustrate a memory matrix 2″ which incorporates within a P type semiconductor substrate body 32″, covered by an insulation layer 34″, PNP transistor isolating elements 6″ at each cross-over point of the matrix. In this form of the invention, the Y axis conductors Y1″, Y2″, Y3″, etc., are formed at the surface of the semiconductor substrate body 32″.

In this instance, the semiconductor substrate body 32″ includes a common transistor collector forming region constituted by the main body of the semiconductor substrate and is shown as P type conductivity material in the exemplary form of the invention. Individual N type conductivity, base-forming regions 6a″ are formed at the location of each of the transistors. As is conventional in semiconductor practice, the base-forming regions 6a″ are formed by doping with a material of opposite conductivity type from the portion of the substrate therebeneath. Similarly, the substrate body includes individual emitter-forming regions 6b″ of P type conductivity material. The emitter-forming regions 6b″ are located at the surface of the semiconductor substrate body 32″ and within the margins of the base-forming regions 6a″ thereof, as is conventional in transistor technology.

The insulating layer 34″ has an opening 34a″ above each transistor 6″ which exposes the upper face of the associated emitter-forming regions 6b″. The insulating layer 34″ also has an opening 34b″ opposite each transistor-forming portion of the substrate body 32″ which overlies a portion of the base-forming region 6a″ to expose this region of the substrate body. A deposited strip 47 of conductive material on the insulating layer 34″ extends between the exposed surface of the base-forming region 6a″ of the substrate body 32′ to the associated X axis conductor. A deposited strip 37″ of conductive material associated with each cross-over point of the matrix extends from the associated emitter-forming region 6b″, exposed by the insulation opening 34a″, to the upper molybdenum layer 4e″ of the associated memory device 4″.

The memory device 4″ at each cross-over point in the embodiment of the invention shown in FIGS. 9 through 11 is substantially the same as the memory device 4′ shown in FIG. 8 and corresponding parts thereof have been similarly numbered. Each of these memory devices 4″ is superimposed over an opening 34c″ overlying the associated Y axis conductor, such as the Y axis conductor Y1″ shown in FIG. 11. A conductive layer 37′ of aluminum or the like fills the opening 34c″ beneath the lower molybdenum electrode 4a of the memory device and thereby interconnects the associated Y axis conductor and the lower molybdenum electrode 4a of the memory device.

The X axis conductors X1″,X2″, etc. of the matrix 2″ shown in FIG. 9 are similar to those shown in FIG. 5. The ends of the Y axis conductors Y1″, Y2″, etc., of the matrix 2″ are shown with alternating enlarged end portions 50 exposed through openings 52 at the top of the matrix so that wires can be soldered directly to the Y axis conductors. A coating 54 of conductive material may be placed on a side edge of the semiconductor substrate body 32″ so that the lower portion of the substrate which represents the common collector of the transistors 6″ can be connected to a source 56 of D.C. voltage, as illustrated in FIG. 12.

While the thickness, width and area of the various circuit elements of the matrices previously described may vary widely, to indicate the extremely small size of the matrix which is possible using the present invention, the following exemplary dimensions should be noted:

- size of memory devices — 5–50 microns wide
- size occupied by diode — 25–130 microns wide
- area occupied by transistors — 25×5 microns to 150×200 microns
- thickness of aluminum deposits — 1–5 microns
- thickness of molybdenum layers — 0.3–1 microns
- thickness of insulation layer — 1–2 microns
- thickness of memory semiconductor material — 0.5–1 microns
- width of Y axis substrate region — 100–200 microns
- width of X axis conductor deposits — 20–60 microns
- spacing of X axis conductors in FIG. 8 embodiment — 10–200 microns
- spacing of Y axis conductor in FIG. 8 embodiment — 20–200 microns Refer now to FIG. 12 which illustrates the circuit of the matrix 2″ and exemplary read and write circuit therefor. As there shown, the base and emitter electrodes of each transistor 6″ are connected in series between the X and Y axis conductors of the associated cross-over point of the matrix. One advantage of using a transistor rather than a diode in the matrix is that it results in a current or voltage gain (current gain in the particular circuit shown), thereby greatly reducing the current or voltage requirements of the driving circuits.

Since the transistors 6″ shown in the exemplary circuits are PNP transistors, the respective X axis conductors connected to the base electrodes of the transistors are respectively connected through suitable switch means 51-1, 51-2, etc. to the negative terminal 53a of the D.C. voltage source 53 whose opposite terminal 53b is shown connected to ground. Each Y axis conductor is connected to an individual set of switch means (which are preferably electronic switches rather than mechanical contacts), such as switch means 55-1, 55′-1, and 55″-1 in the case of the Y axis conductor Y1″, and switch means 55-n, 55″-n, and 55″-n in the case of the Y axis conductor Yn″. The various sets of switch means are connected to a common conductor 61 through respective resistors such as 60-1, 60′-1 and 60″-1, and 60-n, 60′-n, and 60″-n, and to the positive terminal 62a of a D.C. voltage source 62 whose negative terminal 62b is grounded.

The common collectors of all the transistors are connected to the negative terminal 56*a* of a source 56 of voltage whose positive terminal 56*b* is grounded. The magnitude of the output of the D.C. voltage source 56 is smaller than that of the D.C. voltage source 53. For a setting operation, the appropriate set of switch means described above are closed to couple the D.C. voltage sources 53 and 62 to the selected X and Y axis conductors to cause current first to flow in and through the base and emitter electrodes of the transistor at the selected cross-over point of the matrix. As the application of the voltage source 53 to the associated memory device 4'' exceeds the voltage threshold level thereof to drive the same from its initial high resistance condition to a low resistance condition. Then the amplified collector current flows in the transistor, as previously indicated. The voltage should be applied to the associated cross-over point for a relatively long period of time to assure the establishment of the low resistance condition of the associated memory device. For resetting, appropriate switch means are closed to couple the voltage sources 53 and 62 into the circuit for a short period and so the appropriate reset current will flow as determined by the value of the associated reset circuit resistors 60'-1, 60'-*n*, etc. Similarly, for a readout operation, the associated switch means are closed to couple the proper voltages and currents into the circuit for a readout operation as previously described.

When aluminum like the aluminum layer 37' is to be overlaid by other conductive elements care must be taken to eliminate or minimize oxidation of the top surface of the aluminum which could hinder the formation of a good conductive path therebetween. The problem of preventing or minimizing oxidization of the upper surface of the aluminum can be eliminated entirely by forming the memory devices in the manner illustrated by the embodiments of FIGS. 13–14 and FIGS. 15–16. These embodiments make electrical connection to the diodes or transistors in the substrates involved by aluminum layers which have no overlying conductors, so oxidation of the top surface of the aluminum layers has no adverse affect.

Figures 13, 13A:
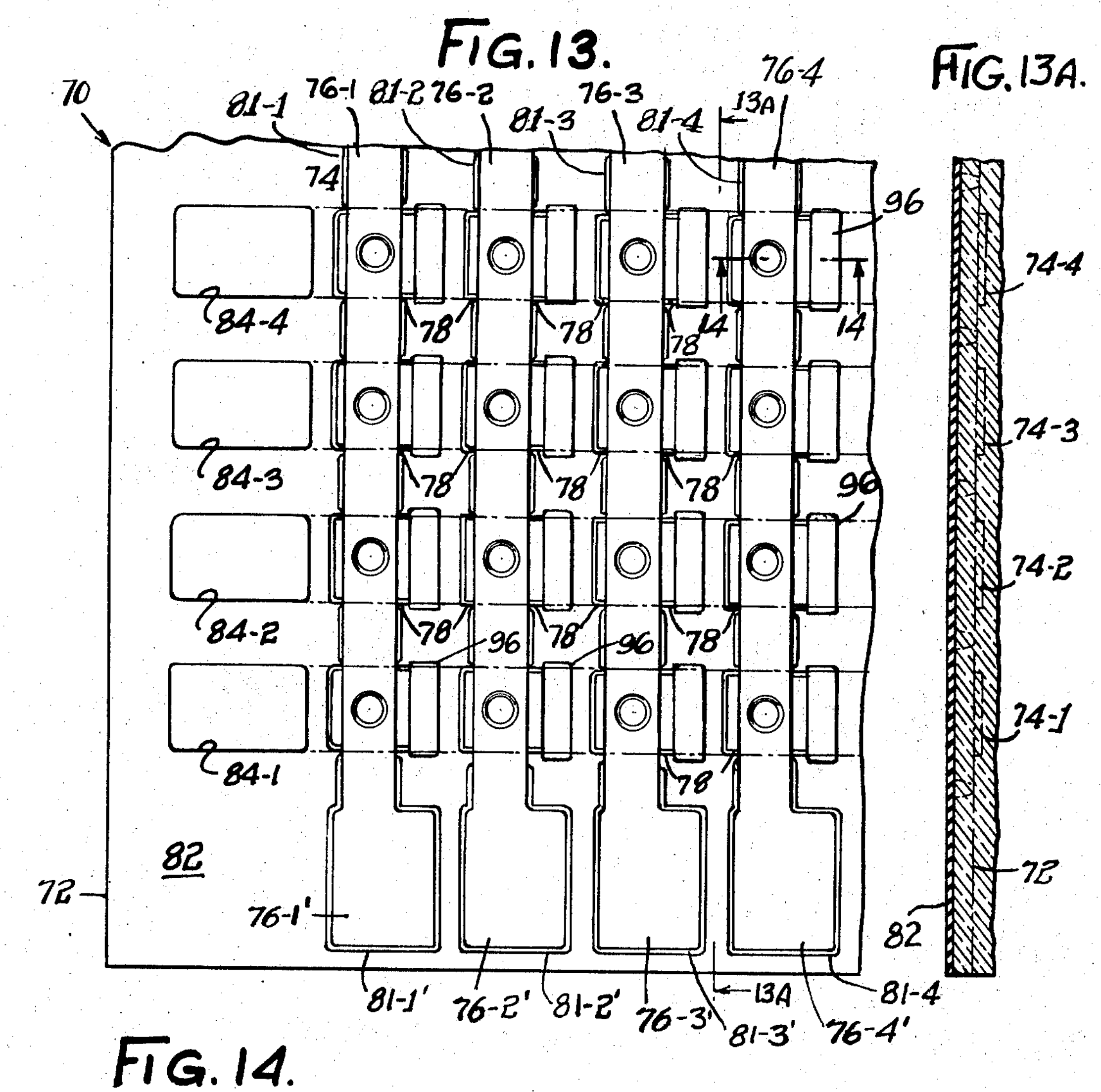
FIG. 13 is an enlarged top view of a portion of an integrated circuit memory matrix showing an alternate form of construction in accordance with this invention.
FIG. 13A is a sectional view of the matrix array of FIG. 13 taken along section line 13A—13A in FIG. 13.
Figure 14:
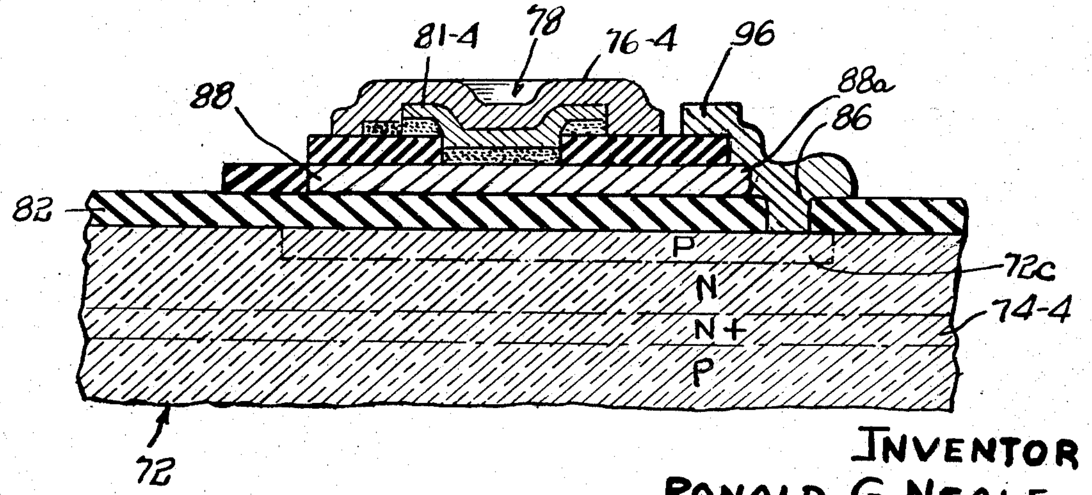
FIG. 14 is an enlarged sectional view taken through section line 14—14 of FIG. 13.

Referring now to FIGS. 13, 13A and 14, there is seen an integrated memory matrix 70 formed within and on a substrate 72 The matrix 70 differs from the other matrices described in the relationship between each pore structure memory device 78 and the associated aperture 86 formed within the insulating layer 82 exposing the isolating element (diode or transistor) formed in the substrate 72. Thus, the apertures 86 are located laterally of each memory device. The bottom electrode-forming layer 88 of molybdenum or the like is deposited directly on the insulating layer 82 and extends adjacent to the associated aperture 86. A layer 96 of aluminum or the like is deposited over an extended portion 88*a* of each electrode-forming layer 88 and extends into the aperture 86.

The substrate 72 has spaced apart regions of N type conductivity material insulated from one another by regions of P type conductivity type material, as in the embodiment of FIGS. 7 and 8 The substrate body 72 also includes a plurality of P type anode-forming regions 72*c* forming individual P-N junction diodes which regions extend beneath the apertures 86 to be contacted by the aluminum layers. (However, it will be understood that transistors, as formed in the embodiment disclosed hereinabove, can be utilized in the matrix 70 instead of the diodes.) A plurality of X axis conductors are provided within the substrate 72 by heavily doping narrow regions 74-1, 74-2, 74-3, 74-6, etc. with N+ conductivity doping material. The Y axis conductors are preferably strips 76-1, 76-2, 76-3, etc., of deposited aluminum overlying strips 81-1, 81-2, 81-3 of amorphous molybdenum or other similar refractory material deposited directly upon the insulating layer 82 on the substrate. The aluminum and molybdenum strips 76-1, 76-2, 76-3, etc. 81-1, 81-2, 81-3, etc., have enlarged terminal-forming portions 76-1', 76-2', 76-3', etc. and 81-1', 81-2', 81-3', etc. External circuit connections are made to the enlarged terminal forming portions 81-1', 81-2', 81-3', etc., as by soldering or the like.

A series of enlarged apertures 84-1, 84-2, 84-3, etc., are formed within the insulating layer 82 preferably along one side of the substrate 72 and extend into the same to a depth where connection can be made to the X axis conductors formed by the N+ regions 74-1, 74-2, 74-3, etc.

Figures 15, 16:
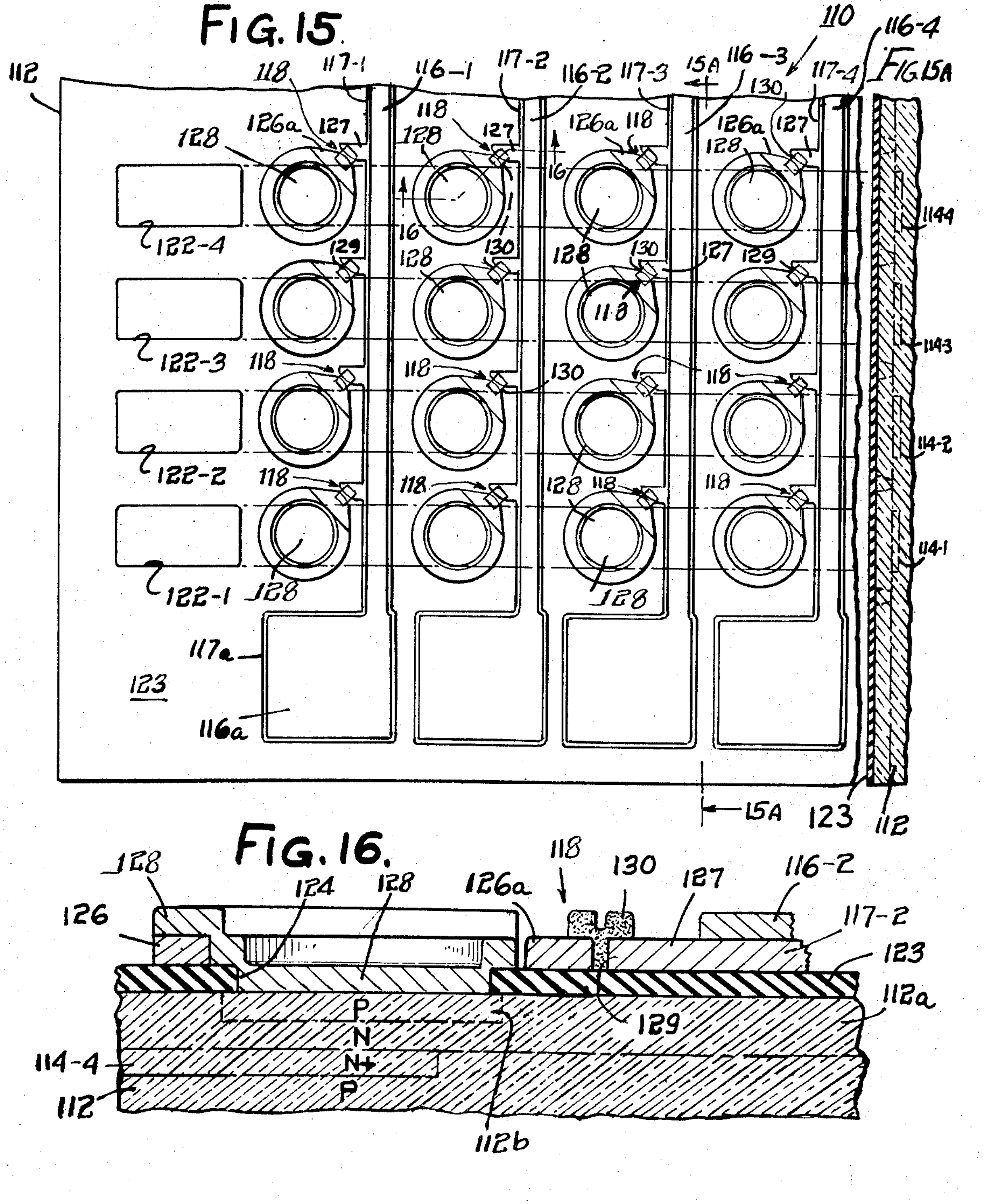
FIG. 15 is an enlarged fragmentary top view of an integrated circuit memory matrix of still another alternate form of construction in accordance with this invention.
FIG. 16 is an enlarged sectional view taken through the section line 16—16 of FIG. 15.

Referring now to FIGS. 15, 15A and 16, there is seen still another alternate form of integrated memory matrix array constructed in accordance with this invention and designed generally by reference numeral 110. Here a substrate body 112 of P type material has formed therein a plurality of parallel spaced apart N type regions 112*a* beneath which are formed a series of X axis conductors 114-1, 114-2, 114-3, etc. which are of heavily doped N+ material. A plurality of coplanar type memory devices 118 are formed in rows and columns on the substrate 112. Within the substrate 112 are formed in spaced alignment on N type strips 112*a* P type anode-forming regions 112*b* which form P-N junction diodes as in the embodiment of FIG. 13. A layer 123 of insulating material, such as silicon oxide where the substrate 112 is of silicon, is formed over the substrate, and, by suitable etching means, a plurality of apertures 124 are formed within the insulating layer 123 to be in registry respectively with the P anode-forming regions 112*b*. A plurality of parallel spaced apart Y-axis conductor-forming strips 116-1, 116-2, 116-3, etc., of aluminum or the like are deposited over corresponding deposited strips 117-1, 117-2, 117-3, etc., of a refractory material like molybdenum preferably in an amorphous state. At the same time the molybdenum strips 117-1, 117-2, 117-3, etc., are deposited, a plurality of substantially annular conductive areas 126 of the same material are deposited on the insulating layer 123. Each annular deposit 126 of molybdenum has an electrode-forming portion 126*a* extending in the direction of and terminating a short distance from a corresponding electrode-forming portion 127 formed by an extension of the associated adjacent molybdenum strip 116-1, 116-2, 116-3, etc.. A gap 129 between each pair of electrode-forming portions 126*a* and 127 is filled with a deposit 130 of memory semiconductor material which also overlies the electrode-forming portions 126*a* and 127 to form a coplanar memory device. The threshold voltage value of such a memory device is dependent upon, among other things, the spacing between the electrodes in contact therewith.

A substantially circular aluminum layer 128 fills each aperture 124 to make contact with the associated anode-forming region 112*b* and overlies the associated annular molybdenum deposit 126. The aluminum makes a good bond with the substrate 112 and, because it is a much better conductor than molybdenum, distributes the current to reduce heat and power loss. The molybdenum underlying the aluminum is needed as the electrode-forming material for the associated memory device and as a good bonding material to the insulating layer 123. As in the other embodiments of the invention, the aluminum and molybdenum strips 116-1, 116-2, 116-3, etc., 117-1, 117-2, 117-3, etc., have enlarged terminal-forming ends 116a and 117*a* to which suitable connection can be made for connecting the matrix array 110 to the voltage control circuits. Similarly, the X axis conductors formed by the N+ region 114-1, 114-2, 114-3, etc. within the substrate 112 are exposed through apertures 122-1, 122-2, 122-3, 122-4, etc., which are etched through the insulating layer 123 and substrate.

It should be understood that numerous modifications may be made in the various preferred forms of the invention described without deviating from the broader aspects thereof.

I claim:

1. A non-destructive memory matrix comprising: a semiconductor substrate having spaced parallel matrix conductor-forming regions of a given conductivity type formed within said semiconductor substrate and extending in spaced generally parallel relation to a first face of the substrate to form X or Y axis conductors of the matrix which are effectively insulated from one another; insulating layer means on said first face of said substrate; spaced parallel bands of conductive material deposited on said insulating layer means and extending generally transversely of said spaced parallel conductor-forming regions of said semiconductor substrate to form the other Y or X axis conductors of the matrix and crossing the X or Y axis conductors in spaced insulated relation thereto; and a memory device deposited adjacent each active cross-over point of the X and Y axis conductors of the matrix, each memory device including a deposited film of memory semiconductor material having spaced portions electrically coupled between the X and Y conductors of the associated cross-over point of the matrix and including means which makes the same triggerable into a stable relatively low resistance condition when the value of a voltage applied across said spaced portions exceeds a given voltage threshold level and which condition remains in such low resistance condition independently of the presence or absence of an applied voltage or current.

2. The memory matrix of claim 1 wherein each of said films of memory semiconductor material is resettable from a low resistance condition to a high resistance condition by the feeding of a given reset current pulse between said spaced portions thereof.

3. The memory matrix of claim 2 wherein each of said films of memory semiconductor material is resettable by a short current pulse exceeding a given value.

4. The memory matrix of claim 1 wherein said films of semiconductor memory material have bidirectional characteristics which conduct current substantially equally in either direction, and said voltage threshold level thereof is independent of the polarity of the applied voltage.

5. The memory matrix of claim 1 wherein there is provided read-out means for applying between any selected X axis conductor and any selected Y axis conductor a given voltage which effects current flow through the associated film of memory semiconductor material when it is in a low resistance condition.

6. The memory matrix of claim 2 wherein the X and Y axis conductors are to be addressed for set and reset operations, and there is provided in combination with said memory matrix, set means for applying between any selected X axis conductor and any selected Y axis conductor a set voltage which effects current flow in the associated film of memory semiconductor material by applying a voltage thereacross which exceeds its voltage threshold level; reset means for applying between any selected X axis conductor and any selected Y axis conductor a reset voltage which effects the flow of a reset current pulse through the associated film of memory semiconductor material when in its low resistance condition; and readout means for applying between any selected X axis conductor and any selected Y axis conductor a readout voltage which effects the flow of readout current when the associated film of memory semiconductor material is in its low resistance condition.

7. The memory matrix of claim 1 wherein there is integrally formed within the semiconductor substrate adjacent each active cross-over point of the matrix a doped P-N junction-forming region constituting an isolating means connected in series with the associated film of memory semiconductor material of the associated X and Y axis conductors involved, said isolating means normally isolating each cross-over point from the other crossover points.

8. The memory matrix of claim 7 wherein each of said P-N junction-forming regions of the semiconductor substrate is a single P-N junction forming diode.

9. The memory matrix of claim 7 wherein each of said P-N junction forming regions of the semiconductor substrate is located respectively immediately adjacent the associated conductor-forming region thereof constituting the associated X or Y axis conductor of the matrix and between such conductor-forming region and said first face of the semiconductor substrate.

10. The memory matrix of claim 1 wherein each of said memory devices is a deposited film on said first face of said semiconductor substrate in alignment with the associated conductor-forming region constituting the associated X or Y axis conductor of the matrix.

11. The memory matrix of claim 7 wherein each film of memory semiconductor material is deposited upon said first face of said semiconductor substrate over the associated P-N junction forming region of the semiconductor substrate.

12. The memory matrix of claim 7 wherein each of said P-N junction forming regions forms the control and load electrodes of a transistor, two of said electrodes being connected in series with the associated memory device and the other electrode extending to an external terminal of the matrix.

13. The memory matrix of claim 1 wherein said insulating layer means has a plurality of apertures formed therein, each aperture being adjacent a crossover point of a pair of X and Y axis conductors and each memory device is electrically coupled to the associated X or Y axis conductors located within the substrate through its associated aperture.

14. The memory matrix of claim 1 wherein said semiconductor substrate is a silicon chip substantially of one conductivity type and said spaced parallel conductor-forming regions within said semiconductor substrate are of the opposite conductivity type and heavily doped to form a highly conductive region in the substrate.

15. The memory matrix of claim 1 wherein each memory device includes a first deposit of electrode-forming material making contact with one of said spaced portions of the associated film of memory semiconductor material and coupled to the associated X or Y axis conductor forming region within said substrate through said insulating layer means, and another deposit of electrode-forming material making contact with the other spaced portions of the associated film of memory semiconductor material 16. The memory matrix of claim 15 wherein said memory semiconductor material is a generally substantially amorphous material and the portion of said deposits of electrode-forming material in contact therewith being a substantially amorphous refractory material.

17. The memory matrix of claim 16 wherein said substantially amorphous refractory material is one of the group consisting of molybdenum, titanium, tantalum, niobium and refractory metal oxides, carbides and sulphides.

18. The memory matrix of claim 1 wherein each of said memory devices includes an insulating material with a pore formed extending therethrough, an electrode-forming material beneath the pore of said insulating material and coupled to the X or Y axis conductor formed within said semiconductor substrate, said film of memory semiconductor material being deposited within said pore to be in direct contact with said electrode-forming material.

19. The memory matrix of claim 18 wherein said deposit of memory semiconductor material of each memory device only partially fills said pore to a fraction of the depth of said pore, an electrode-forming conductive material filling the said pore, and the portion of the Y or X axis conductors deposited on said semiconductor substrate and associated with said memory device being connected to said electrode-forming material.

20. The memory matrix of claim 19 wherein said memory semiconductor material is a generally substantially amorphous material and the portion of said deposits of electrode-forming material in contact therewith being a substantially amorphous refractory material.

21. The memory matrix of claim 20 wherein said substantially amorphous refractory material is one of the group consisting of molybdenum, titanium, tantalum, noibium and refractory metal oxides, carbides and sulphides.

22. The memory matrix of claim 1 wherein there is provided an aperture within said insulating layer means adjacent each cross-over point of said X and Y axis conductors to expose a circuit element forming portion of said substrate, and there is provided for each memory device a first deposit of a conductive electrode-forming material on said insulating layer means below and contacting the associated deposit of memory semiconductor material to form a first electrode therefor; and a second deposit of conductive electrode-forming material over said deposit of semiconductor material and electrically contacting the same to form a second electrode for the memory semiconductor material; and a portion of said first deposit of conductive electrode-forming material being overlaid by a layer of readily oxidizable material which enters the associated aperture to make electrical connection with said circuit element forming portion of said substrate.

23. The memory matrix of claim 22 wherein said deposits of electrode-forming material are a refractory material.

24. The memory matrix of claim 23 wherein each deposit of said refractory material is in an amorphous condition at least at the surface in direct contact with said memory semiconductor material.

25. The memory matrix of claim 1 wherein there is provided an aperture within said insulating layer means adjacent each cross-over point of said X and Y axis conductors to expose a portion of said semiconductor substrate, a first deposit of a refractory conductive material on said insulating layer means around each of said apertures, a second deposit of a non-refractory conductive material over each of said first deposit of refractory conductive material except for a small electrode-forming portion of said first deposit of conductive material which is free of said second deposit of non-refractory conductive material, each second deposit of conductive material extending into the associate aperture to make electrical contact with the exposed portion of said semiconductor substrate, an electrode-forming portion extending from each of the said Y or X axis conductors formed over said semiconductor substrate and spaced from the electrode forming portion of said first deposit of conductive material, and said memory semiconductor material of each memory device being deposited within the space between the said opposing electrode forming portions.

26. A memory matrix array comprising: a support base made of semiconductor material and having a plurality of X axis conductors, a plurality of Y axis conductors insulated from and extending transversely of said X axis conductors to form insulated cross-over points of the matrix, memory switch device-forming material and isolating device-forming material associated with each active cross-over point of said X and Y axis conductors and connected in series between the same, the memory switch device-forming material associated with each active cross-over point being a deposit on said side of said support base adjacent the associated cross-over point, the memory switch device-forming material including means making the same alterable by application of a voltage which exceeds a threshold level from a stable condition of relatively low resistance which persists indefinitely after the applied voltage is removed therefrom until reset to a high resistance, the isolating device-forming material associated with each crossover point being a doped region of said semiconductor material of the support base located adjacent the associated cross-over point and which region includes means imparting to the same a conductive condition where it acts as a low resistance to a desired flow of current through the memory switch device-forming material of the associated cross-over point and a non-conductive condition where it isolates the associated cross-over point from the other cross-over points when the memory switch device-forming material thereat is in a low resistance condition, one of said plurality of X or Y axis conductors being located on the side of said support base on which said memory switch device-forming material is deposited and the other of same being on the side of said doped regions of the semiconductor support base remote from said switch device-forming memory material.

27. The memory matrix of claim 26 wherein said one plurality of the X or Y axis conductors are doped regions within the support base.

28. A non-destructive memory matrix comprising: a substrate having spaced parallel matrix conductor-forming regions formed within said substrate and extending in spaced generally parallel relation to a first face of the substrate to form X or Y axis conductors of the matrix which are effectively insulated from one another; an isolating element formed within the substrate adjacent each active cross-over point of the X and Y axis conductors; insulating layer means on said first face of said substrate; spaced parallel bands of conductive material deposited on said insulating layer means and extending generally transversely of said spaced parallel conductor-forming regions of said semiconductor substrate to form the other Y or X axis conductors of the matrix and crossing the X or Y axis conductors in spaced insulated relation thereto; and a memory device deposited on the substrate beneath the Y or X axis conductor adjacent each active cross-over point, the isolating element and memory device of each cross-over point being connected in series between the X and Y axis conductors thereof, each memory device including means making the same alterable by application of a voltage which exceeds a threshold level from a stable condition of relatively high resistance to a stable condition of relatively low resistance which persists indefinitely after the applied voltage is removed therefrom until reset to a high resistance, each isolating element having means imparting thereto a conductive condition where it acts as a low resistance to a desired flow of current through the associated memory switch and a non-conductive condition where it isolates the associated cross-over point from the other cross-over points when the body of memory switch device-forming material thereat is in a low resistance condition.

29. The memory matrix of claim 28 wherein each memory device and associated isolating element are located in alignment with the associated cross-over point.

30. The memory matrix of claim 1 wherein said parallel matrix conductor-forming regions of a given conductivity type in the semiconductor substrate are separated by doped regions of semiconductor material of opposite type which electrically isolate the same from one another.

31. The memory matrix of claim 30 wherein said parallel matrix conductor-forming regions in the substrate are spaced from said first face thereof, and said semiconductor substrate between each such matrix conductor-forming region and each deposited memory device at each active matrix cross-over point is doped to form at least one P-N junction constituting at least part of an isolating means connected in series between the associated memory device and matrix conductor-forming region.

* * * * *